United States Patent
Iball et al.

(10) Patent No.: US 10,754,901 B2
(45) Date of Patent: Aug. 25, 2020

(54) ANALYTICS OF ELECTRONIC CONTENT MANAGEMENT SYSTEMS USING A STAGING AREA DATABASE

(71) Applicant: Alfresco Software, Inc., San Mateo, CA (US)

(72) Inventors: John Iball, Maidenhead (GB); Will Abson, Maidenhead (GB); Gethin James, Maidenhead (GB)

(73) Assignee: Alfresco Software, Inc., San Mateo, CA (US)

(*) Notice: Subject to any disclaimer, the term of this patent is extended or adjusted under 35 U.S.C. 154(b) by 716 days.

(21) Appl. No.: 15/402,112

(22) Filed: Jan. 9, 2017

(65) Prior Publication Data

US 2018/0196878 A1    Jul. 12, 2018

(51) Int. Cl.
*G06F 16/00* (2019.01)
*G06F 16/9535* (2019.01)
*G06F 16/22* (2019.01)
*G06F 16/45* (2019.01)

(52) U.S. Cl.
CPC .......... *G06F 16/9535* (2019.01); *G06F 16/22* (2019.01); *G06F 16/45* (2019.01)

(58) Field of Classification Search
CPC ....... G06F 16/9535; G06F 16/22; G06F 16/45
See application file for complete search history.

(56) References Cited

U.S. PATENT DOCUMENTS

| | | | |
|---|---|---|---|
| 9,418,085 B1 | 8/2016 | Shih et al. | |
| 2004/0199517 A1* | 10/2004 | Casati | G06F 16/283 |
| 2005/0273460 A1 | 12/2005 | Abrams et al. | |
| 2008/0288629 A1 | 11/2008 | Fisher, III et al. | |
| 2009/0300043 A1 | 12/2009 | MacLennan | |
| 2011/0087516 A1* | 4/2011 | Frieden | G06Q 10/06 705/7.26 |
| 2011/0307603 A1* | 12/2011 | Ishikawa | H04L 67/26 709/224 |
| 2012/0095984 A1 | 4/2012 | Wren-Hilton et al. | |
| 2013/0081056 A1* | 3/2013 | Hu | G06F 16/35 719/313 |
| 2015/0100582 A1* | 4/2015 | Xi | G06F 16/7867 707/738 |
| 2015/0317361 A1 | 11/2015 | Battaglia et al. | |
| 2016/0292219 A1* | 10/2016 | Prabhakar | G06F 16/35 |
| 2016/0351189 A1* | 12/2016 | Miller | G06F 3/0482 |
| 2017/0091400 A1 | 3/2017 | Richards et al. | |
| 2017/0193039 A1* | 7/2017 | Agrawal | G06F 16/245 |
| 2017/0272336 A1 | 9/2017 | Johnstone et al. | |
| 2018/0137147 A1 | 5/2018 | Abson et al. | |
| 2018/0203931 A1 | 7/2018 | Abson | |

* cited by examiner

*Primary Examiner* — Alexander Khong
(74) *Attorney, Agent, or Firm* — Mintz Levin Cohn Ferris Glovsky and Popeo, P.C.

(57) ABSTRACT

Event information associated with an occurrence of an event in an electronic content management system can be routed to an event information broker of an analytics engine that is configured to maintain data routing continuity by storing the event information in a system memory. The analytics engine can be logically and/or physically separate from the electronic content management system. The broker can separate event information into event topic bins. Messenger listeners can be used to obtain event information and store it in a staging area database for analysis and reporting without interfering with the operations of the electronic content management system.

18 Claims, 5 Drawing Sheets

ANALYTICS OF ELECTRONIC CONTENT MANAGEMENT SYSTEMS USING A STAGING AREA DATABASE

TECHNICAL FIELD

The subject matter described herein relates generally to content management systems and to obtaining multi-dimensional reports and analytics based on data generated by events that occur on content management systems.

BACKGROUND

Enterprise content management (ECM) covers a broad range of applications, including document management (DM), Web content management (WCM), records management (RM), digital asset management (DAM), search of managed content, and the like. A content management system (CMS) suitable for managing the various content (also referred to herein in some examples as "files" or "documents") that an enterprise produces or generates, retains or otherwise stores, manipulates or modifies, etc. can support the requirements of one or more of such applications, and optionally other requirements, to provide a coherent solution in which content processes, management processes, and the like are capable of accessing content across a variety of applications subject to access controls, permissions, and the like. Content managed by a CMS can include one or more of documents, images, photos, Web pages, records, XML documents, other unstructured or semi-structured files, etc. Content retained in a CMS can also include directory structures such as folders, file trees, file plans, or the like, which can provide organization for multiple content items in addition to storing or otherwise representing relationships between content item, etc. An "enterprise" can generally refer to an organization, such as for example a business or company, a foundation, a university, or the like, and can have content requirements related to one or more business processes, content uses, etc.

A CMS manages the actual digital binary content, the metadata that describes a context of each content item, associations between a content item and other content or content items, a place and classification of a content item in a repository, indexes for finding and accessing content items, etc. The CMS can also manage processes and lifecycles of content items to ensure that this information is correct. The CMS can also manage one or more workflows for capturing, storing, and distributing content, as well as the lifecycle for how long content will be retained and what happens after that retention period.

A CMS for use in enterprise content management can include one or more of document management tools, applications, and interfaces to support general office work, search, and discovery. Workflow management capabilities of a CMS can support numerous business processes, optionally including, but not limited to, case management and review and approval. Collaboration applications and services of a CMS can support the collaborative development of information and knowledge in the creation and refinement of content and documents. This collaborative development of information and knowledge can be achieved through providing access to content managed by the CMS to multiple users. To prevent conflicting or discontinuous editing streams, a user can be allowed to check out or lock content for modification and check in the modified content such that other users are prevented from editing content concurrently. Web content management services of a CMS, which can be scalable, can support the delivery and deployment of content from the enterprise to its customers. Records management capabilities of a CMS can capture and preserve records based upon government-approved or other standards. A standards-based platform can also provide access to applications that use these standards, such as publishing, image management, email management, etc.

SUMMARY

As discussed in greater detail below, features of the current subject matter can enable identification and analysis of events occurring in a CMS. The events can relate to content items managed by the CMS. The events can relate to the status of the CMS. By identifying and analyzing events, the CMS can manage and maintain the content items. Changes to content items can be more effectively tracked and monitored to ensure continuity of access for database users. Features of the current subject matter can support multi-dimensional reporting analytics of activity associated with an ECM system. Multi-dimensional reporting analytics can be facilitated via by the capture of integrated process information from elements of an ECM system. The elements of the ECM can include, but are not limited to, content repositories, user activities, business process activities, and/or other elements.

In one aspect, a method includes routing event information associated with an event occurring at an electronic content management system to a broker. The routing is performed by an analytics engine that is logically separate from the electronic content management system. The event information includes one or more event topics. The broker maintains data routing continuity by storing the event information in a system memory of the analytics engine. The method further includes sorting the event information received at the broker into one or more event topic bins associated with one or more attributes of the event information. The sorting is performed by one or more message listeners, which direct the event information to the one or more event topic bins associated with the one or more attributes. The method also includes storing the event information in the one or more event topic bins in a staging area database disposed on electronic storage associated with the analytics engine. The staging area database is configured to facilitate analysis of the event information, in the one or more event topic bins, to analyze the electronic content management system.

In optional variations, one or more of the following features can be included in any feasible combination. The method can further include integrating the event information in the one or more event topic bins. The integrating of the event information in the one or more event topic bins can be performed in accordance with a predefined integration schedule. The method can further include extracting the integrated event information into an analytics cube, and transforming the integrated event information into a data format to facilitate querying of the integrated event information. The transforming can include generating a star schema for the integrated event information. The star schema can include the integrated event information and facilitate querying of the integrated event information. The method can further include generating a unified view of the electronic content management system from the analytics cube. The unified view can include a view on the event information from the electronic content management system that appears to be from a single data source. Alternatively or in addition, the method can include generating a report based on results from querying of the integrated event information facilitated by the star schema. Any or all of the integrating, the extracting, the transforming, the generating of the unified view, and/or the generating of the report can be performed by the analytics engine.

The method can further include generating a recommendation for a content item based on the report. The generating of the report can be performed without requiring the use of resources of the electronic content management system.

The one or more attributes of the event information can include one or more of an event activity, an event process, and an event task. The event information can include one or more of a time of the event and a user associated with the event. The event information can includes serialized event data that includes one or more of a content identification, a content type, a content size, and a content location. The one or more attributes of the event information can be based on a source of the event information. The receiving of the event information by the analytics engine can be in real or near-real time relative to when the event occurs. The one or more message listeners and the broker can be implemented as part of the analytics engine.

Implementations of the current subject matter can include, but are not limited to, methods consistent with the descriptions provided herein as well as articles that comprise a tangibly embodied machine-readable medium operable to cause one or more machines (e.g., computers, etc.) to perform operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise software system or other content management software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

CMS architectures are generally business critical systems. When the CMS architecture suffers a failure it can impact business. In some cases, when a CMS architecture fails it can have a catastrophic impact on the ability to perform the functions of a business. Consequently, operators of CMS architectures need to monitor the state of the CMS architecture to determine a failure event so that the failure may be corrected as soon as possible, or to predict a future failure event so that solutions can be implemented to avoid the occurrence of that future failure event.

Logs can be created associated with the CMS architecture or components of the CMS architecture. Logs can be generated in response to a PRINT command at the end, or during, the execution of a process. The logs may then be analyzed to determine the occurrence of a failure or predict a future failure of the CMS architecture. Waiting for logs to be generated in this manner requires that the process that includes the PRINT command complete before the log, or log-line, is generated.

The present description describes generating information associated with events occurring within a CMS architecture without the need to wait for formal logs to be generated at the CMS architecture. The event information can be translated into log files for further analysis. The event information can include information associated with content items stored using the CMS architecture, business processes associated with the CMS architecture, user interactions with the CMS architecture, and/or other events. The present description describes generating this event information without needing to wait for the completion of the event.

Consistent with implementations of the current subject matter, one or more log files generated by the events taking place within the CMS architecture can be translated into an aggregated data structure (e.g. an analytics cube), which can further support a star schema structure that can be generated dynamically in response to detected events or groups of events and/or in response to requests for reporting or other analytical measures on activities of the electronic content management system. The aggregated data structure and/or the star schema structure can facilitate the generation of a unified view of the events occurring in the CMS architecture. The unified view can provide an indication of failures (e.g. fault events or the like) within the CMS architecture and/or facilitate the prediction of future failures within the CMS architecture. The unified view can present data from the analytics cube, which can include aggregated data that are binned according to one or more criteria such as event topic or the like. The unified view, which represents to a user a view on the event information from the content management system that appears to be from a single data source, can be further supported in the form of active (e.g. supporting click-through access to underlying data) reports based on the data from the analytics cube further populating relational database tables forming a star schema. As used herein, an analytics cube can include a multi-dimensional array of data. The data of the analytics cube can be analyzed to look for insights into the data. The unified view can facilitate the probabilistic prediction of future events.

The term "analytics cube" generally refers to a multi-dimensional data structure useful in supporting online analytical processing (typically referred to by the acronym "OLAP"). The alternative term "OLAP cube" is generally synonymous with an analytics cube. OLAP approaches are generally directed toward automated or otherwise computer-implemented techniques for analyzing large, multi-dimensional data sets to identify relationships or other insights (e.g. trends or the like) and to efficiently reply to multi-dimensional queries.

In an analytics cube, numeric facts (which can be referred to as "measures") can be categorized by dimensions. The measures are placed at the intersections of the cube, which is spanned by the dimensions as a vector space. While the term "cube" is commonly used, it does not denote or require exactly three dimensions (e.g. the number of dimensions can be any number) or any kind of symmetry between the dimensions (e.g. "sides" of the "cube"). Dimensions in a data cube (or any data structure) generally refer to structured labeling of information used to organize otherwise unordered numeric measures.

Figure 1:
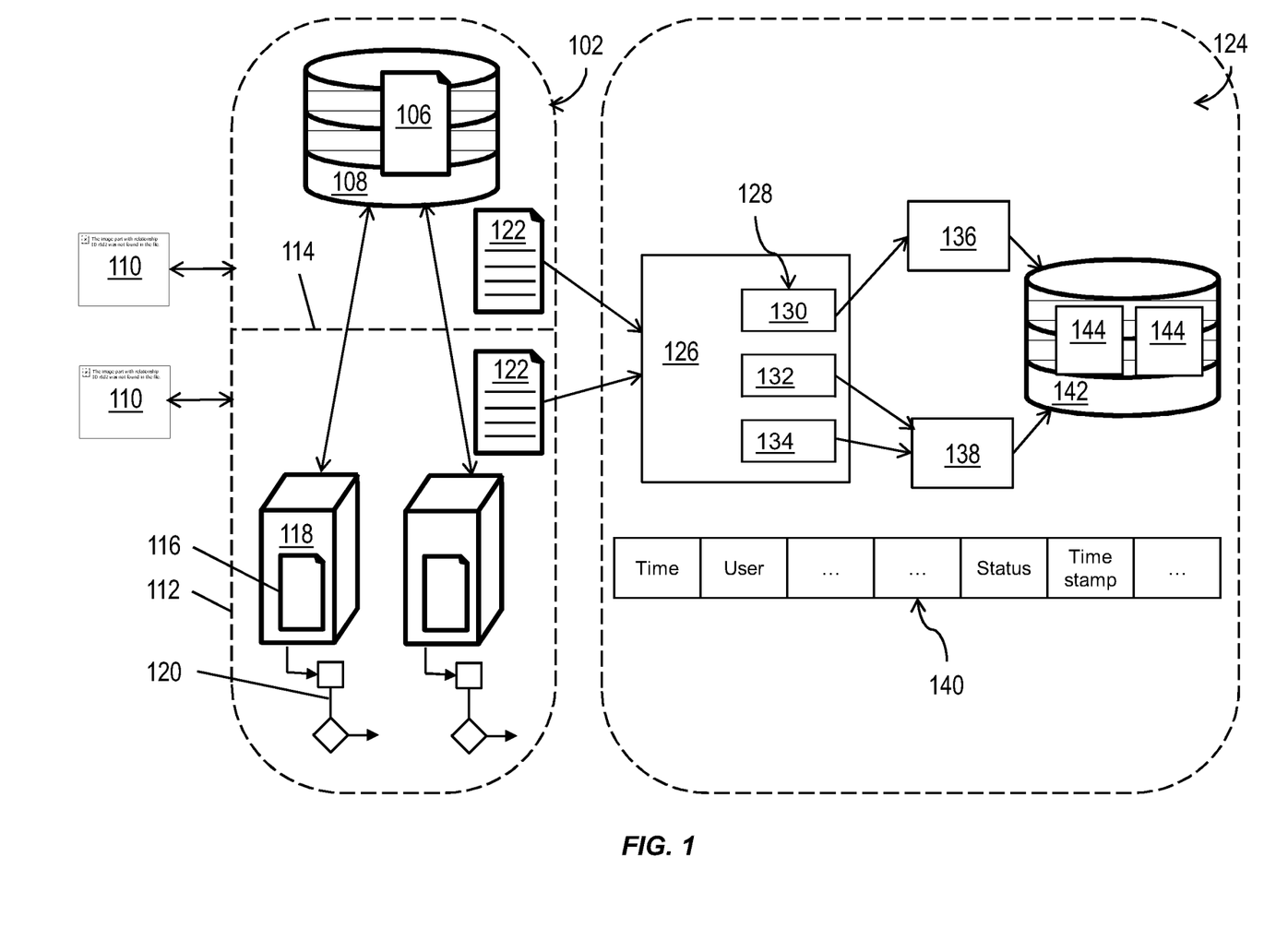
FIG. 1 shows a diagram illustrating elements of a computing architecture having one or more elements consistent with the present description.

FIG. 1 shows a diagram illustrating features of a computing architecture 100 consistent with implementations of the current subject matter. A CMS 102 can generally include at least one programmable processor executing some form of machine-readable instructions (e.g. software code, etc.) to provide one or more content management functions. In some variations, the CMS 102 can be cloud-based. The cloud-based CMS can include a cloud-based repository. The cloud-based CMS can be isolated to provide access only to authorized users of a specific location within the cloud-based installation. Alternatively or in addition, computer hardware can be configured to perform one or more of the operations or the like described herein.

A typical enterprise may own or otherwise manage or have custodial responsibility for content 106 subject to a range of access controls. Some content 106 of the enterprise may be freely sharable, while some other content 106 may be highly confidential or otherwise subject to security control. However, a third type of content 106 of the enterprise may exist somewhere between these two extremes.

Currently available approaches to enterprise content management generally do not include capabilities relating to the capture, analysis, and reporting of events that occur within the CMS 102. It is typical for content 106 that is managed by a CMS 102 of an enterprise to be stored on electronic storage 108. In response to a user accessing the content 106, the CMS 102 can be configured to lock the content 106 from further edits by other users. If another user attempts to access the content 106 and make modifications, the other user can be prohibited from accessing the content 106. In some variations, the other user can be prompted that the content is locked to editing, and/or any content modified by the other user can be saved as another version of the original content 106. In some variations, where content 106 is locked, or "checked out," other users are prohibited from both saving over the content 106 stored in electronic storage 108 and from saving the modified content as another version of the content 106. The original user can save any modified content over the original content 106 or cause the modified content to be saved as a new version of the original content 106.

Services and controls for managing content of a CMS 102 consistent with implementations of the current subject matter can include features such as metadata management, version control, lifecycle management, workflow, search, associations to other content, tagging, commenting, etc., that allow users of the CMS 102 to find desired content items among very large content collections that can span multiple parts of an enterprise. Accuracy and consistency of the information can also be ensured, even for very large content collections across an enterprise. Content and other information in a CMS 102 can be presented, published, etc. through the Web or any other channel appropriate to allow users to access that information.

In addition to supporting features typical of a cloud-based or "software as a service" (SaaS) software delivery model, a synchronization scheme consistent with the descriptions provided herein can provide a number of desirable features. For example, the current subject matter can support automatic synchronization of content between one or more CMS-managed repositories that are inside of a firewall and a copy of one or more content items that are made accessible to authorized collaborating users of the collaboration site in the cloud. Such features can enhance ease of engagement and collaboration both between users within an organization and other collaborating users who are external to the organization. The term firewall is generally used throughout this disclosure to refer to network security controls, features, functionality, etc. that restrict access to users outside of the firewall to content retained on one or more repositories inside of that firewall.

Users 110 can access the CMS 102. Users 110 can access content 106 managed and maintained by the CMS 102 after being authenticated. In some examples, authentication can be established through interaction of the user 110 with one or more user interface elements, such as for example, a window, a navigation pane, or another display feature including one or more user interface elements, an inline prompt, etc. The interface element(s) can be managed by the CMS 102. The user(s) 110 can be internal users or external users. Internal users can be users that are within a firewall 112. Internal users can be users that operate from within a firewall managed by the CMS 102. External users can be users that operate from outside a firewall managed by the CMS 102. External users may be required to seek authorization to access programs and systems that are within the firewall 112. A firewall 112 can exist within the CMS 102 between various components and areas of the CMS 102. In some examples, an additional or alternative firewall 114 can exist between the CMS 102 and one or more servers configured to provide additional functionality to the CMS 102.

The user(s) 110 can be required to supply authentication credentials on at least a first request to set up a synchronization between a content item held within the firewall-protected installation of the content management system 102 and a copy of the content item stored on a computing device of the user(s) 110. The authentication credentials can be saved in a secure credentials store, or the like, for future synchronization actions. Optionally, the authentication credentials can be checked for accuracy when they are entered to prevent, for example, an incorrect password, username, or other credentials, from being saved in the secure credentials store.

The CMS 102 can include a permissions log. When a user 110 attempts to access the CMS 102 through the firewall 112, a determination of whether the user 110 can access the CMS 102 can be determined. Once within the firewall 112, or if the user 110 originated from within the firewall 112, a determination can be made as to whether the user 110 has permission to perform each of the tasks or activities requested by the user 110. The permissions log can include a list of users 110 of the CMS 102 and their respective permissions. The permissions log can include information as to the access rights of users to content items 106, business process applications (BPAs) 116, and the like. While a permissions log is described, the present description contemplates multiple permissions logs. In some variations, each content item 106 or BPA 116, for example, can include its own permissions log. The term "content" is generally used throughout this disclosure to mean folders, files, directory structures, or the like (also referred to herein as "content items"). In addition to permissions logs, other log files may be generated by a CMS 102, such as for example to record changes to content and/or metadata associated with content items, file structures, and the like. Transaction logs can reflect data and/or metadata updates and/or whether such updates have been committed (e.g. in a case in which changes to data and/or metadata are initiated from a remote system and may not be committed to the actual content item stored in the CMS repository until some further action is taken by a user, task, workflow, application, etc.

Consistent with some aspects of the current subject matter, one or more dynamically configurable BPAs 116 can be supported within an installation of a CMS 102. A BPA server 118 can manage and maintain the BPA(s) 116.

As referred to herein, a BPA 116 can be based on an application model definition (AMD), which can define functionality for guiding one or more users through a set of actions consistent with completion of an instance of a business process (or other structured arrangement of activities, tasks, etc.). The set of actions can include either, or both, of tasks requiring interactions of one or more human users of CMS 102 and automated actions (e.g. actions performed by a system without direct human interaction). A BPA 116 can be used multiple times for discrete "workflow instances" (also referred to as "execution instances") of a business process or part of a business process supported by the BPA 116.

Dynamically configurable, customizable BPAs 116, such as those described herein, can guide workflow instances based on a current context of one or more users, documents (or other content items), systems, etc. This guidance can be provided via a user-interface defined by the BPA being executed as part of a workflow instance, which can, in turn, be part of a case. As discussed in greater detail below, a BPA 116 can optionally be initially configured using an application development user interface (ADUI), and can itself include user interface features that promote collaboration and information access among multiple users involved in a content management-based business process. Some variations of the current subject matter include hybrid BPAs 116, which can be configured to execute from one CMS installation while being able to access content on a second CMS installation, even if the second CMS installation is behind a firewall. In this way, a BPA 116 can be a Web application, which can access both content maintained at a first, cloud-based CMS repository and content maintained at a second, on-premise CMS repository. Synchronization of workflow actions, content, and case data relating to execution of one or more workflow instances can readily occur between the CMS repositories of the two CMS installations.

An AMD can be constructed using an ADUI, such as for example an ADUI having one or more of the features further discussed below. An AMD can serve as a modeled framework for one or more BPA variations. For example, an AMD can be directed to a business process for content creation, modification, approval, and execution, such as a business process relating to generation, revision, review, signing, archiving, etc. of a contract. Other examples of AMDs can include collaboration applications, records management applications, and the like.

A BPA 116 based on an AMD can be defined with greater specificity to tailor the BPA to reflect details of one or more business processes specific to a sub-organization of the enterprise (e.g. a legal department, a human resources department, etc.) or to some other organization, for a different specific purpose, etc. As used herein, a BPA 116 refers to a variation, version, instance, etc. of an application model (defined by an AMD), which can be further refined or defined based on one or more expected use criteria, such as, for example, a target audience that will use the BPA 116, a specific set of custom actions related to tailoring the BPA 116 to a target use, or the like. As an example, the contracts application model discussed above can be deployed as a legal contracts BPA, a human resources contracts BPA, a real estate contract BPA, or the like. As discussed further below, a BPA 116 can also be dynamically configurable such that user actions in response to guidance provided by the BPA 116 during a workflow instance based on the BPA 116 can deviate from the guided or recommended actions as defined in the BPA 116. Such user actions can also impact guidance provided by the BPA 116 in the course of subsequent workflow instances based on the BPA 116. In some examples, a user can save a modified or new BPA based on updated or altered guidance developed at least in part based on case data retained for one or more past workflow instances.

As used herein, a workflow instance refers to a specific instance or iteration of a set of actions guided by a BPA 116 for a specific document or set of documents. As an example, for a BPA 116 related to contract review, the review of a contract or a set of related contracts can constitute a workflow instance of the BPA 116.

Information associated with events occurring in a CMS 102 can be extracted using one or more processes. For example, an extract, transform, and load process can be used to extract information associated with events occurring in the CMS 102. The information associated with the events can include events associated with content items 106, business process applications 116, and/or other elements of the CMS 102. After the information is extracted, the resulting data can be transformed, for example by applying one or more rules or functions to prepare these data for loading into an integration database. It will be understood that some extracted data may not require transformation.

The information associated with events occurring within the CMS 102 can include events associated with content items 106 stored and/or maintained by the CMS 102. The CMS 102 can comprise electronic storage 108 configured to store and maintain the content items 106. Users 110 can interact with the content items 106 through interaction with the CMS 102, through one or more intermediary applications, workflows, or the like. Different types of interaction with the content items 106 can be an event. For example, opening, modifying, saving, creating a new version, closing, deleting, moving, updating of the content item 106, or the like, can generate event information. As noted above, event information can be maintained by the CMS in the form of one of more log files.

The information associated with the CMS 102 can include events associated with a BPA server 118. In some variations, users 110 may not interact with the BPA server 118 or the BPA(s) 116 directly, but may interact with the BPA(s) 116 and/or BPA server(s) 118 through intermediary or third-party applications.

A BPA 116 can cause one or more business processes 120 to be executed. A business process 120 can include one or more actions or transactions. Event information can be generated for each of the BPAs 116, the business process(es) 120, and/or for the individual actions or transactions that comprise the business process(es) 120.

Use of, or interaction with, BPAs 116 by users 110 can generate multiple different types of event information. BPAs 116 may interact with content items 106 maintained by the CMS 102. Consequently, event information associated with the BPAs 116 and the content items 106 can be generated based on a single user interaction.

Event information can be generated based on the performance and/or functionality of the CMS 102 components. For example, the CMS 102 can comprise multiple software, firmware, and hardware components. Performance of, for example, a server of the CMS 102, a BPA server 118, a computing device associated with a user, or the like, can generate event information.

FIG. 1 includes a conceptual representation of event information 122 in the CMS 102. The present description contemplates the event information 122 being transferred to an analytics engine 124 in response to the creation of the individual event information 122. In some variations, event information 122 may be generated from one or more sources at roughly the same time. This event information can be aggregated at the CMS 102 and transmitted to the analytics engine 124 together. In some variations, the event information 122 from separate sources and/or events is separately transmitted to the analytics engine 124.

The analytics engine 124 can be logically and/or physically separate from the CMS 102. Logical separation can refer to a state where the software processes associated with a first task occur without interference from the software processes associated with a second task. For example, the processors configured to perform tasks associated with the analytics engine 124 can be the same processors configured to perform tasks associated with the CMS 102, however, for purposes of the processing, the two tasks are totally separate, without one task relying on a process of the other task. In other words, the processes associated with a first task are independent of the processes associated with a second task. Physical separation can refer to processors that are physically separate from each other. Physically separate processors can be located within the same computer housing, but are otherwise separate and independent from one another. In other variations, physically separate processors can be disposed in completely separate machines.

The event information 122 associated with the occurrence of an event in an CMS 102 can be accepted (e.g. received) by an analytics engine 124. The event information 122, which can optionally be in the form of one or more log files, transaction logs, etc., can comprise one or more event topics having event topic types. Event topics can optionally include serialized event data.

In some variations, a queuing mechanism can be used to transmit the event information 122 to the analytics engine 124. The queuing mechanism can be configured to deliver the event information 122 to the analytics engine 124 without impacting the performance of the CMS 102. In some variations, the queuing mechanism can be configured to provide the event information 122 to the analytics engine 124 in real-time or near-real-time. Such a queuing mechanism can facilitate delivery of event information 122 to the analytics engine 124 without having to wait for the underlying transaction to be completed. The queueing mechanism can be configured as either (or optionally both) of a push or a pull arrangement for moving data from the CMS 102 to the analytics engine. For example, the CMS 102 can be configured to push event information to the analytics engine 124 concurrently with writing of relevant information to one or more log files at the CMS 102. The term "concurrently" as used herein can refer to actual simultaneous execution of two or more operations or to a serial arrangement in which a first operation and a second operation are not actually performed simultaneously, but nonetheless occur sufficiently closely in time to be effectively concurrently with regard to a relevant time period. Alternatively or in addition, the analytics engine 124 and/or the CMS can be configured such that the analytics engine 124 requests or "pulls" event information from the CMS 102 (e.g. by querying log files or the like) on a scheduled basis or in response to indication from the CMS that one or more trigger conditions have been met (e.g. occurrence of a certain number of events generating related event information, etc.).

The analytics engine 124 can comprise a broker 126. In some variations, the broker can include a JAVA messaging server. The event information 122 can be routed to the broker 126 as discussed above (e.g. either by a push or pull queuing mechanism). The broker 126 can be configured to maintain data routing continuity by storing the received event information 122 in a system memory. The event information 122 can be routed to the broker 126 in real-time or near-real-time.

The broker 126 can include one or more topics 128 (also referred to as channels). The event information 122 can be binned into the one or more topics 128 based on the event information type. In some variations, the event information 122 can be tagged with an event type. The event type can be based on the source of the event information 122. For example, event information 122 emanating from an interaction with content items 106 maintained by the CMS 102 can include a CMS event type, event information 122 emanating from BPAs 116 can include a BPA event type, and the like. In this manner, the broker can operate as a pre-aggregator to collect and aggregate event information relating to similar event types into common topics 128.

The event types 128 can include activities 130, tasks 132, processes 134, or the like. Activities 130 can include user-interactions with content items 106 maintained by the CMS 102. In some variations, processes 134 can be generated from tasks 132. The broker 126 can be configured to store the event information 122 in the different event type 128 categories, in memory.

The analytics engine 124 can include one or more agents. For example, the analytics engine 124 may include a first event listener 136 and a second event listener 138. The event listeners 136, 138 can be subscribed to one or more of the event type bins 128. The event listeners 136, 138 can be configured to extract, from the event-type bins 128 the event information 122. For example, the first event listener 136 may be an activity listener. The activity listener can be configured to subscribe to the activity topic 130. Event information binned into the activity topic bin can be extracted by the activity listener. The second event listener 138 may be a task listener. The task listener can be configured to subscribe to the task topic 132 and/or the process topic 134. Event information binned into the task topic bin and/or the process topic bin can be extracted by the task listener.

As noted above, the broker 126 can be configured to sort the event information into one or more event topic bins 128. The sorting can optionally be performed by one or more message listeners. The one or more event topic bins can be based on the event topic type. The one or more message listeners can be configured to subscribe to an event topic type. A message listener can be an object that acts as an asynchronous event handler for messages. The object can be configured to take a set of predefined actions in response to encountering a message having a particular set of attributes. The set of attributes can include a message type. A message type can include a type of message, a destination type for the message, or the like. The set of attributes can include a message format. The broker 126 can include a plurality of message listeners. Each message listener can be configured to listen for a message having a particular set of attributes. For example, a first message listener can be configured to listen for messages having a first message type and/or a first message format. In response to encountering a message(s) having a first message type and/or a first message format, the message listener can be configured to send the message(s) to a first event topic bin 128.

The event information 122 stored in the event type bins 128 can include different event information elements 140. The event information elements 140 can include one or more of a time, user information, serialized data, status information, a time-stamp, or the like. The serialized data can include event-type-dependent data. For example, if the event-type was a log-in, the serialized event data may not include additional data. If the event-type was a download of a content item 106, the serialized data may include an identity of the content item 106, the site location of the document, the site location of the user downloading the content item 106, the file size of the content item 106, the format of the content item, etc., or the like. In some variations, the event information can be comprised of metadata.

In some variations the broker 126 can be configured to determine whether any of the stored event information 122, whether taken individually or in aggregated form as in an analytics cube, includes or relates to a failure or other "fault event" occurring at the electronic content management system. Such event information is referred to herein as "fault event information." The broker 126 can store the fault event information locally. The broker 126 can be configured to analyze and diagnose a fault, or other failure, introduced by or related to the fault event information. In some variations, the broker 126 may store the fault event information until an administrator can review the fault event information. In some variations, the broker 126 may be configured to transmit an indication of the fault event information and/or information associated with the fault event information to an administrator computing device for review by an administrator.

Event information 122, which may include fault event information, can be stored in an electronic storage 142 that is logically integrated into the analytics engine 124 (and can optionally be physically part of a system implementing the analytics engine 124. The analytics engine 124, for example, can include electronic storage 142. In some variations, electronic storage 142 can be associated with the broker 126. Electronic storage 142 can be collocated with one or more processors configured to provide the functionality of broker 126. In some variations, electronic storage 142 can be logically and/or physically separate from the one or more processors configured to provide the functionality of broker 126, for example as in a cloud storage system.

In some variations, the event listener agents 136 and 138 can be configured to write the binned event information to a staging area database. The event information can be stored in the staging area database based on the one or more event topic types. The staging area database can be maintained on electronic storage, for example, electronic storage 142. In some variations, the event information stored in the staging area database can be stored in serialized form. The staging area database can comprise one or more staging area database tables 144, which can in one example include a staging area database table for activities 130, a staging area database table for tasks 132, and a staging area database table for processes 134. A staging area database table can optionally be created and/or an existing staging area database table used for each of the one or more event topics, which can be associated with one or more attributes of the event information. In this example, the staging area database table (or, optionally, more than one staging area database table) for a given event topic can be what is referred to elsewhere herein as an event topic bin for collecting information relating to the associated one or more attributes. The staging area database tables 144 can be created real-time, or near-real-time, as events occur in the CMS 102.

Figure 2:
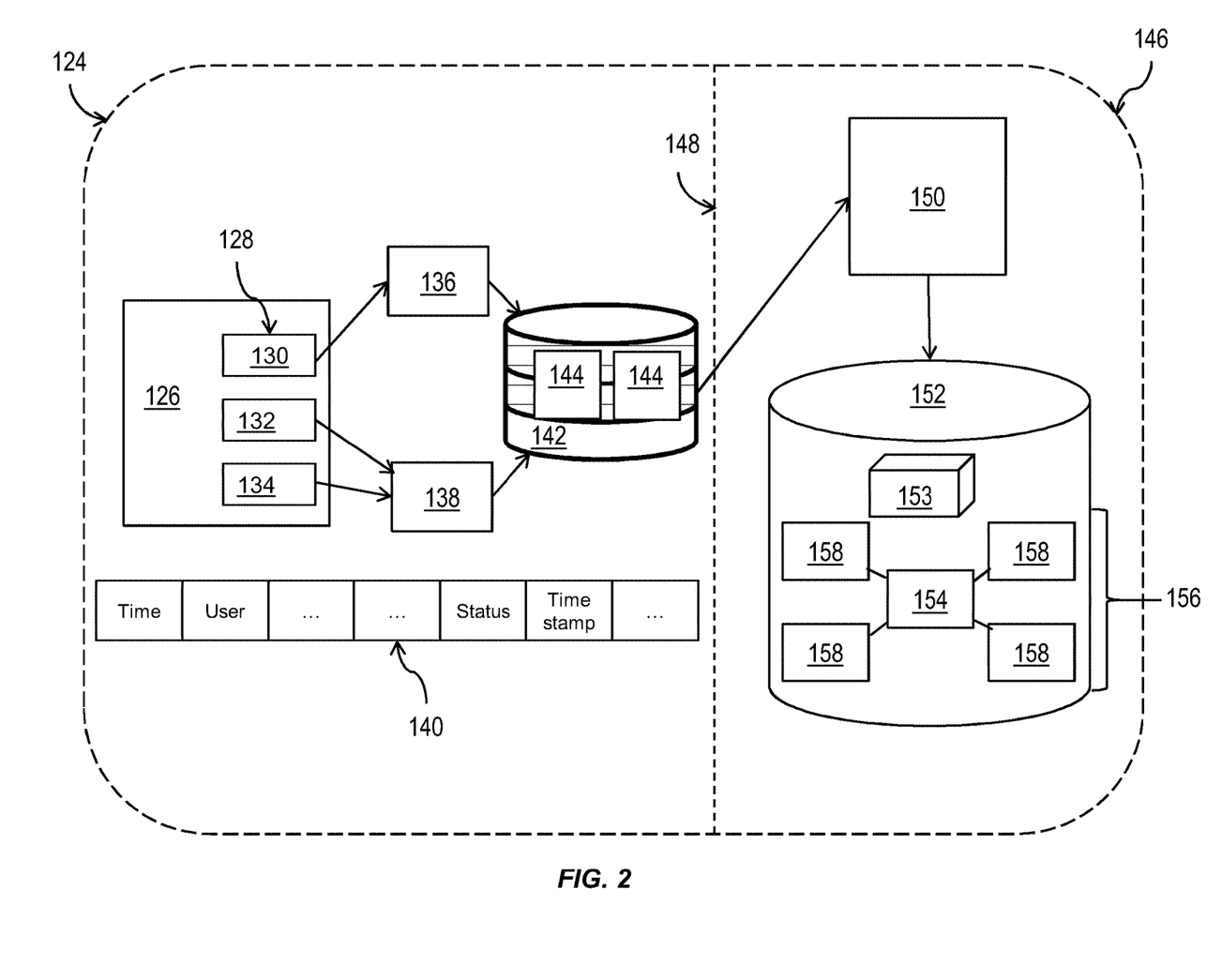
FIG. 2 shows a diagram illustrating features of an analytics engine having one or more elements consistent with the present description.

FIG. 2 is an illustration of an analytics engine 124 having features consistent with the present description. The event information binned by event topic and stored in the staging area database on electronic storage 142 may be transferred to a data analyzer 146. The data analyzer 146 may be logically and/or physically combined within the rest of the analytics engine 124. In some variations a system boundary 148 may be provided.

The data analyzer 146 may comprise a data integrator 150. The data integrator 150 can be configured to integrate the binned event information. The data integrator 150 may operate on an integration schedule. The integration schedule can be predefined by an administrator. For example, the data integrator 150 may operate every 2 minutes, every 5 minutes, every 10 minutes, or the like. The data integrator 150 can operate on any schedule.

The data integrator 150 may be logically linked with an integration database 152, which can include an analytics cube 153 and optionally one or more relational database features. The integration database 152 may include one or more fact tables 154. The fact tables 154 may be arranged as a star schema 156, which is generally a type of relational database structure. The fact tables 154 can reference any number of dimension tables 158. The fact tables 152 may include foreign keys referencing the dimension tables 156. Data can be received at the integration database 152 and input into the one or more fact tables 154. In some variations, the data received at the integration database 152 may be in the form of a fact table 154. The new fact table 154 can be integrated into the star schema 156.

The star schema 156 can be a style of data mart schema. It can be used to develop data warehouses and dimensional data marts. The star schema can consist of one or more fact tables referencing any number of dimension tables. The star schema is so-named from the physical model's resemblance to a star shape with a fact table at its center and the dimension tables surrounding it representing the star's points.

In some variations, the integration database 152 can include one or more separate star schemas 156 for each event information type. For example, the integration database 152 can include a star schema 156 for activity-type event information, a star schema for task-type event information, a star schema for process-type event information, and the like. In other words, the separate star schemas can be created to enable further analysis of the data stored in the staging area database tables (e.g. the event topic bins). A star schema can optionally be created for each event topic and/or each of the one or more attributes associated with the event topic bins. The data in the star schema can be populated from the analytics cube 153, which can in turn be populated via integrating, aggregating, consolidating, or the like of data stored in the staging database tables 144.

The data integrator 150 may be configured to extract, transform and load the binned event information stored in the staging area database (e.g. in the staging area database tables 144). The data integrator 150 can be configured to process the unstructured serialized data 140 of the event information stored in the staging area database tables 144 into the structured star schema 156 stored on the integration database 152. The star schema can include primary key-based relationship between data-types.

In some variations, the data integrator 150 may be configured to obtain the binned event information from the staging area database. The data integrator 150 may be configured to process the status information in each row 140 of the staging area database tables 144. The data integrator 150 can be configured to update the row 140 with a timestamp providing the time at which the row was processed. The data integrator 150 can be configured, based on the timestamp information in each row of the staging area database tables 144, to determine whether or not that row has been processed by the data integrator 150. In some variations, the data integrator 150 can be configured to overwrite the timestamp information in each row of the staging area database table 144 that it processes. The data integrator 150 can be configured to extract, transform and load data based on a desired set of information required to provide the reports desired by the operator of the CMS 102. In some variations, the integration database 152 can be referred to as a data warehouse.

Integration (also referred to as consolidation) can be an important aspect of OLAP approaches involving aggregation of data that can be accumulated and computed in one or more dimensions. The integration database 152 of the current subject matter (e.g. an analytics cube 153) stores pre-computed data in a format that contains all of the possible answers to ranges of possible queries and can therefore provide very rapid response times to such queries. Consistent with implementations of the current subject matter, a data integrator 150 can perform the data integrations, consolidations, etc. necessary to populate the integration database 152 as discussed above.

Figure 3:
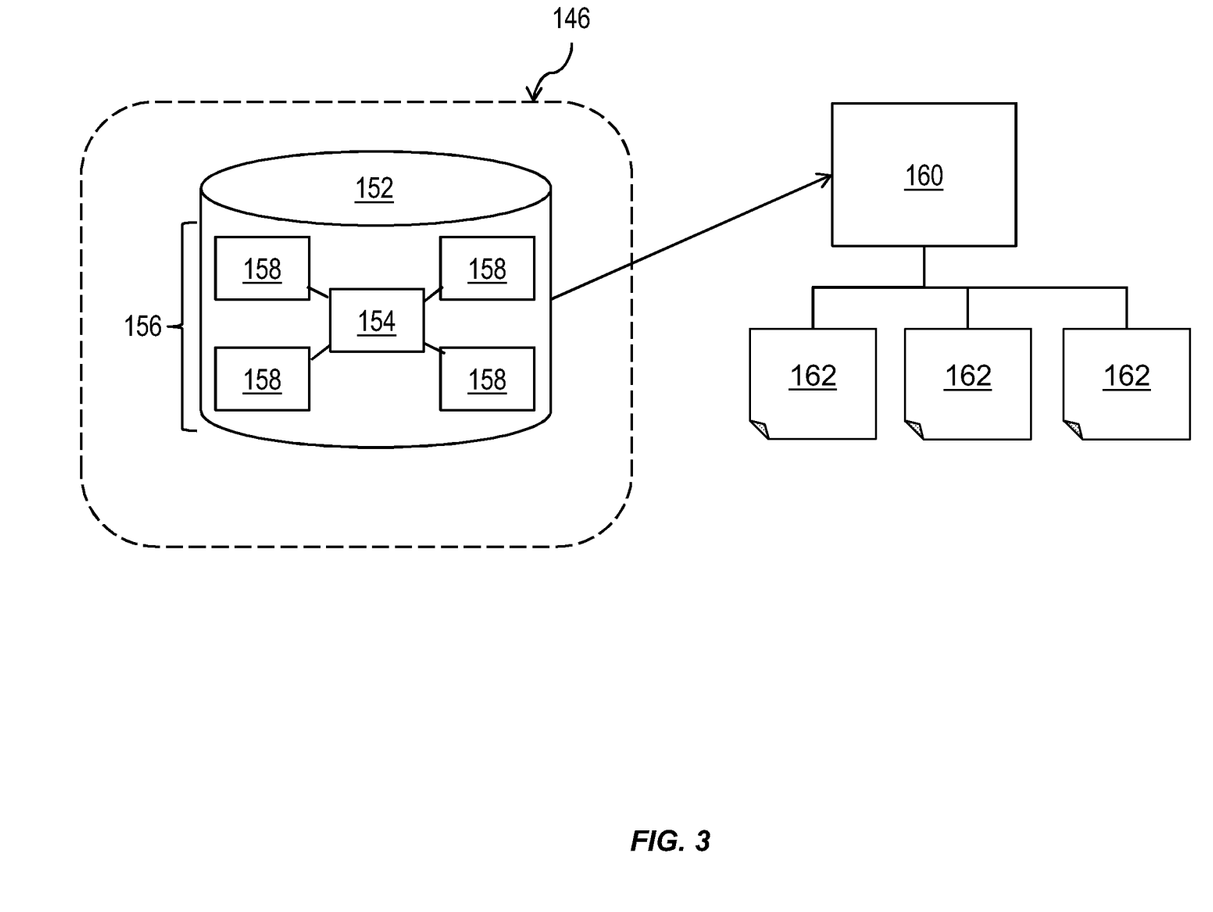
FIG. 3 shows a diagram illustrating features of an analytics engine having one or more elements consistent with the present description.

FIG. 3 is an illustration of an analytical engine having features consistent with the present description. The integration database 152, or data warehouse, can be in electronic communication with one or more analysis computing devices 160. The one or more analysis computing devices 160 can be configured to implement a report engine for performing one or more tasks of the analysis computing devices 160. The analysis computing device 160 can be configured to be operated by one or more analysts. In some variations, the analysis computing device(s) 160 can be or include a server. The server can be configured to be in electronic communication with the integration database 152.

The server can be a business analytics server. The analysis computing device(s) 160 can be configured to provide business analytics reports 162 associated with the events occurring within the CMS 102.

In some variations, the analysis computing device(s) 160 can be configured to generate a recommendation for a content item based on the business analytics report 162. The recommendation for a content item can be based on a context associated with the event information associated with the CMS 102. For example, if an event associated with a particular content item and/or resource of the CMS 102 has recently occurred, the analysis computing device(s) 160 can be configured to infer a user requesting a report on that particular resource, within a certain period of time since the occurrence of the event, would be interested in the content item and/or resource associated with that event. In this example, the recommendation generated by an analysis computing device 160 can include a link or other reference to one or more content items or resources that are inferred to be relevant to the context of the event (as determined by the event information, context, etc.). The analysis computing device(s) 160 can be configured to generate a report that prominently displays that content item and/or resource.

Various implementations of the current subject matter can, among other possible benefits and advantages, provide real-time, or real-near-time, business analytics information associated with events occurring on the CMS 102. Providing real-time or near-real-time business analytics information can, among other possible benefits and advantages, facilitate determination of faults within the CMS 102 as they arise, or near to when they arise, and/or facilitate prediction of future possible faults within the CMS 102. Alternatively, or additionally, event information associated with both content items 106 and task and/or process information can be provided simultaneously, thereby facilitating business analytics on both content items 106 and task and/or process information in real-time, or near-real-time.

Although the examples described herein refer to a CMS installation, an enterprise can maintain multiple CMS installations or collaborate with other enterprise CMS installations. The current subject matter can be configured to synchronize one or more of folders, files, directory structures, or the like, and business processes from a first installation of a CMS to a second CMS installation. Access restrictions on content items can be mirrored on the other CMS installations. Collaborations on content items can be facilitated between multiple on-premise users as well as users external to the premises at which the CMS installation is maintained. The variations of the subject matter described in this disclosure refer to two users modifying content simultaneously. This is for ease of explanation. The current subject matter contemplates multiple users concurrently modifying the content. The current subject matter can facilitate modification of the content by one, two, three, four, five or more users, or groups of users, concurrently.

Services and controls for managing content of a CMS consistent with implementations of the current subject matter can include features such as metadata management, version control, lifecycle management, workflow, search, associations to other content, tagging, commenting, etc. that allow users of the CMS to find desired content items among very large content collections that can span multiple parts of an enterprise. Accuracy and consistency of the information can also be ensured, even for very large content collections across an enterprise. Content and other information in a CMS can be presented, published, etc. through the Web or any other channel appropriate to allow users to access that information.

In one use case, a user 110 can request access to content 106 stored on the data storage system 108 managed by the CMS architecture 102. The CMS 102 can lock the content item 106 from being edited further by other users. The user 110 can be presented with the content item 106 through a display of a user device associated with the user 110. The CMS 102 can require log-in credentials from the user 110.

Figure 4:
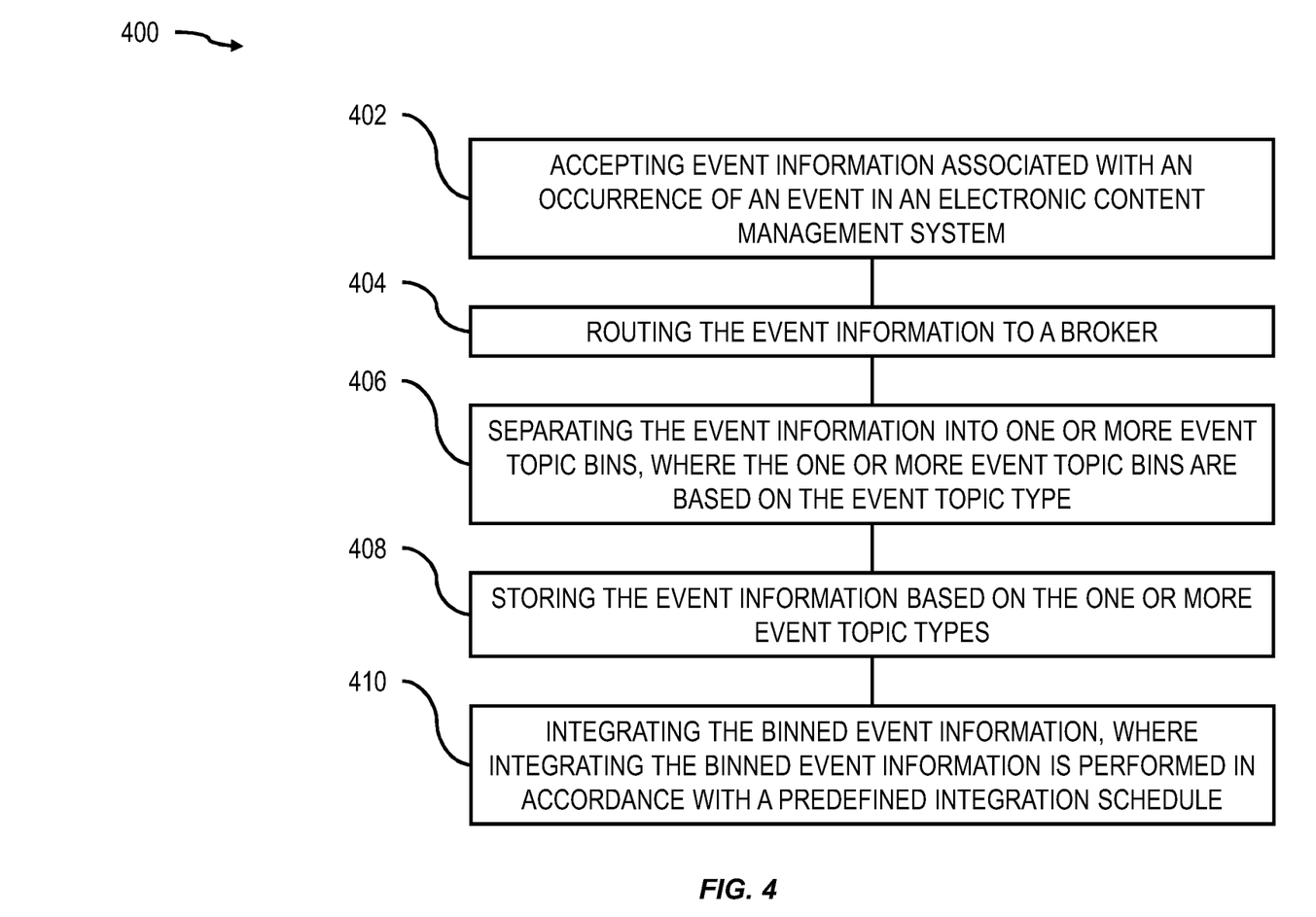
FIG. 4 shows a process flow diagram illustrating one or more features that can be included in a method consistent with implementations of the present description.

FIG. 4 shows a process flow diagram 400 illustrating features that can be included in a method consistent with implementations of the present description. The method can be executed by one or more processors and by one or more elements as described herein. While operations are described herein in a discrete manner, it is contemplated that the method may include one or more additional or fewer operations. Furthermore, operations can be combined or separated. The operations described herein can be performed by one or more processors. The operations described herein can be performed by multiple processors logically and/or physically co-located or logically and/or physically separated.

At 402, event information associated with an occurrence of an event in an electronic content management system can be received, for example at an analytics engine, which can be logically (and optionally physically) separate from the electronic content management system. As discussed above, the receiving of the event information can occur via operation of a queuing mechanism, which can include one or both of push and/or pull operations between the electronic content management system and the analytics engine. The event information can include one or more event topics. The one or more event topics may have event topic types. The event information can include serialized event data.

In some variations, the event information can include one or more of a time of the event or a user associated with the event. The event information can include content identification, a content type, a content size, and a content location. The one or more event topics associated with the event information can be based on the source of event information in the electronic content management system.

At 404, the event information can be routed to a broker of the analytics engine. The broker can be configured to maintain data routing continuity by storing the event information in a system memory.

At 406, the event information can be sorted into one or more event topic bins. The one or more event topic bins can be based on the event topic type. The event topic bins can include activity-type bins, task-type bins, process-type bins, and the like. One or more message listeners can be configured to subscribe an event topic type. The one or more message listeners can be configured to extract event information having a particular event topic type.

At 408, the event information can be stored at a staging area database. The storing of the event information at a staging area database can be based on the one or more event topic types. The staging area database can include one or more staging area database tables. The staging area database tables can comprise rows of the serialized data associated with the event information. The serialized data can include various information elements, for example, time, user identity, serialized data, status, timestamp information associated with modifications or processes, and the like.

At 410, the binned event information can be integrated, such as for example in an analytics cube. Integrating the binned event information can be performed in accordance with a predefined integration schedule. The integration schedule can be any desired schedule. For example, the integration schedule can be every 1 minute, 2 minutes, 5 minutes, 10 minutes, 1 day, 1 week, 1 month, or the like.

Figure 5:
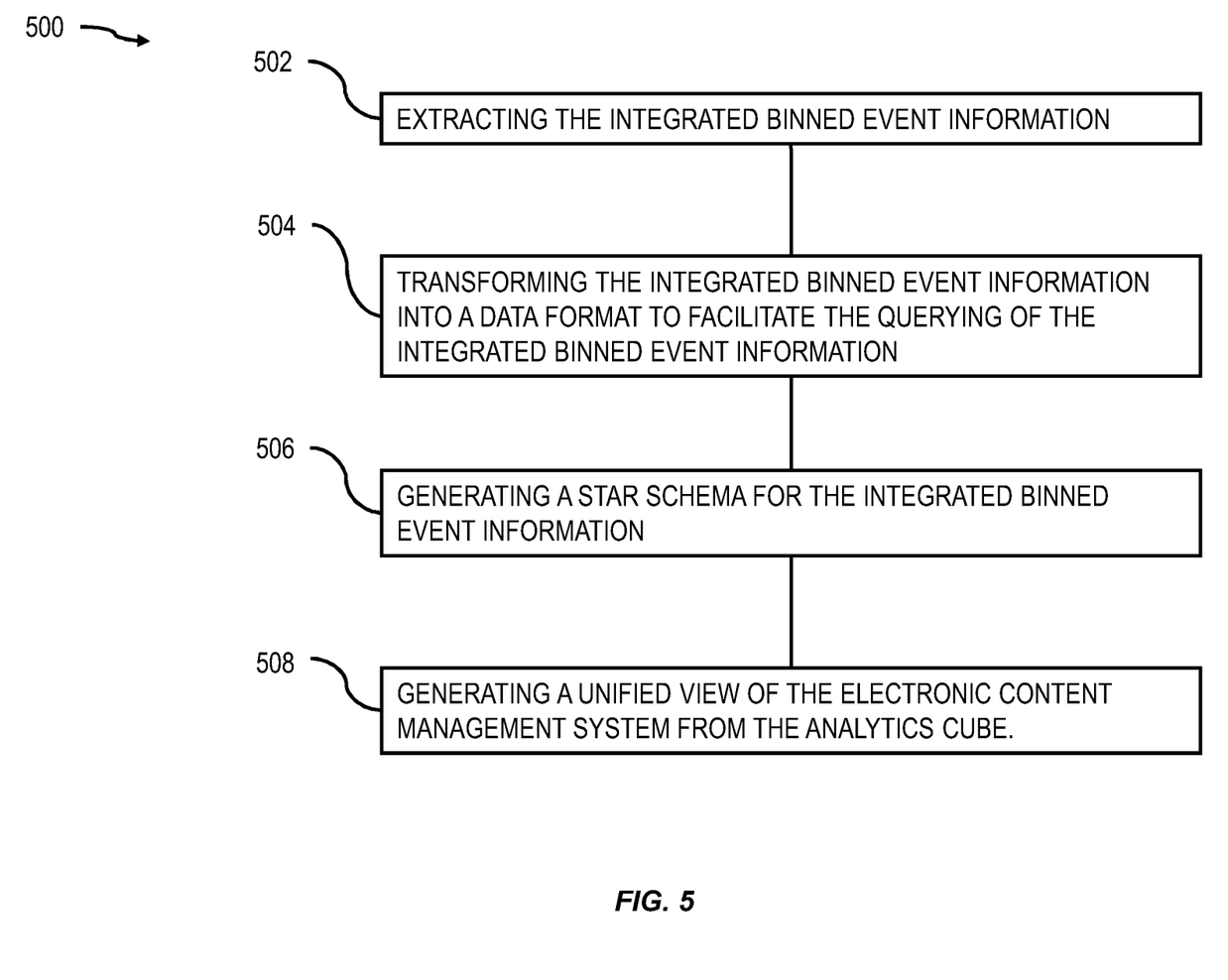
FIG. 5 shows a process flow diagram illustrating one or more features that can be included in a method consistent with implementations of the present description.

FIG. 5 shows a process flow diagram 500 illustrating features that can be included in a method consistent with implementations of the present description. The method can be executed by one or more processors and by one or more elements as described herein. While operations are described herein in a discrete manner, it is contemplated that the method may include one or more additional or fewer operations. Furthermore, operations can be combined or separated. The operations described herein can be performed by one or more processors. The operations described herein can be performed by multiple processors logically and/or physically co-located or logically and/or physically separated.

At 502, the integrated binned event information can be extracted from the storage area. At 504, the integrated binned event information can be transformed into a data format to facilitate the querying of the integrated binned event information. For example, and as noted above, the transforming of the data can include application of one or more rules or functions to the extracted data to prepare it for loading into the integration database. In some variations, transforming the integrated event topics into a proper data format comprises formatting the integrated event topics for loading into the integration database, which, as noted above, can include an analytics cube.

At 506, a star schema can be generated. The star schema can be configured for the integrated binned event information stored in the analytics cube. The star schema can facilitate querying of the integrated binned event information based on one or more primary data sets of the integrated binned event information. In some variations, a primary data set can be a data set having one or more attributes associated with the integrated binned event information associated with a particular topic bin.

At 508, a unified view of the electronic content management system can be generated. As noted above, a unified view refers to a front end (e.g. as might be presented to a user via a user interface on a computing machine or via some other approach) that appears to a user to represent a single underlying data source while the actual data being presented may be accessed from multiple different data structures. A report can be generated based on results from querying of the integrated binned event information facilitated by the star schema. Generating a report can be performed in near real-time and in the absence of querying the content management system. The content management system need not be queried due to the data and/or metadata associated with events of the content management system being stored in an analytics engine, which can quickly access the integration database without requiring access to the content management system.

Use of the analytics engine and integration database can increase the efficiency of the content management system by reducing processing and/or memory requirements to generate reports. Furthermore, reports can be instantaneously obtained as opposed to having to wait for a log-file, for example, to be completed by the content management system. Also, reports relating to system performance and/or other events relating to content items and/or CMS resources can be generated via the integration database without the need for direct access to the CMS. Because data and metadata extracted from the CMS are transformed and aggregated for loading into the integration database, use of the integration database can be allowed without requiring evaluation of access permissions for the actual content stored the CMS.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean "based at least in part on" such that an unrecited feature or element is also permissible.

Other implementations than those described herein may be within the scope of the following claims.

What is claimed is:

1. A method implemented on an analytics engine, the analytics engine forming at least part of a computing system, the method comprising:

receiving, by the analytics engine, event information associated with an event occurring at an electronic content management system, the electronic content management system comprising data storage storing content;

routing, by the analytics engine that is logically separate from the electronic content management system, the event information associated with the event to a broker, the event information comprising one or more event topics, the broker configured to maintain data routing continuity by storing the event information in a system memory of the analytics engine;

sorting the event information received at the broker into one or more event topic bins associated with one or more attributes of the event information, the sorting being performed by one or more message listeners, the one or more message listeners directing the event information to the one or more event topic bins associated with the one or more attributes;

storing the event information in the one or more event topic bins in a staging area database disposed on electronic storage associated with the analytics engine, the staging area database being configured to facilitate analysis of the event information, in the one or more event topic bins, to analyze the electronic content management system; and integrating, by the analytics engine and in response to the storing, the event information in the one or more event topic bins, wherein the integrating of the event information in the one or more event topic bins, is performed in accordance with a predefined integration schedule.

2. The method as in claim 1, further comprising:

extracting, by the analytics engine, the integrated event information into an analytics cube; transforming, by the analytics engine, the integrated event information into a data format to facilitate querying of the integrated event information, the transforming comprising generating a star schema for the integrated event information, the star schema comprising the integrated event information and facilitating querying of the integrated event information.

3. The method as in claim 2, further comprising:

generating, by a report engine, a unified view of the electronic content management system from the analytics cube, the unified view comprising a view on the event information from the electronic content management system that appears to be from a single data source.

4. The method as in claim 2, further comprising:

generating, by a report engine, a report based on results from querying of the integrated event information facilitated by the star schema.

5. The method as in claim 4, further comprising:

generating a recommendation for a content item based on the report.

6. The method as in claim 4, wherein generating the report is performed without requiring the use of resources of the electronic content management system.

7. The method as in claim 1, wherein the one or more attributes of the event information comprise one or more of an event activity, an event process, and an event task.

8. The method as in claim 1, wherein the event information comprises one or more of a time of the event and a user associated with the event.

9. The method as in claim 1, wherein the event information comprises serialized event data that comprises one or more of a content identification, a content type, a content size, and a content location.

10. The method as in claim 1, wherein the one or more attributes of the event information are based on a source of the event information.

11. The method as in claim 1, further comprising receiving the event information by the analytics engine in real or near-real time relative to when the event occurs.

12. The method as in claim 1, wherein the one or more message listeners and the broker are implemented as part of the analytics engine.

13. A system comprising:

a programmable processor; and a memory configured to store computer-readable instructions which, when executed by the programmable processor, cause the programmable processor to perform operations comprising:

receiving, by the analytics engine, event information associated with an event occurring at an electronic content management system, the electronic content management system comprising data storage storing content;

routing event information associated with the event to a broker, the routing being performed by an analytics engine that is logically separate from the electronic content management system, the event information comprising one or more event topics, the broker configured to maintain data routing continuity by storing the event information in a system memory of the analytics engine;

sorting the event information received at the broker into one or more event topic bins associated with one or more attributes of the event information, the sorting being performed by one or more message listeners, the one or more message listeners directing the event information to the one or more event topic bins associated with the one or more attributes;

storing the event information in the one or more event topic bins in a staging area database disposed on electronic storage associated with the analytics engine, the staging area database being configured to facilitate analysis of the event information, in the one or more event topic bins, to analyze the electronic content management system; and integrating, by the analytics engine and in response to the storing, the event information in the one or more event topic bins, wherein the integrating of the event information in the one or more event topic bins, is performed in accordance with a predefined integration schedule.

14. The system as in claim 13, wherein the operations further comprise:

extracting, by the analytics engine, the integrated event information into an analytics cube; transforming, by the analytics engine, the integrated event information into a data format to facilitate querying of the integrated event information, the transforming comprising generating a star schema for the integrated event information, the star schema comprising the integrated event information and facilitating querying of the integrated event information.

15. The system as in claim 14, wherein the operations further comprise:

generating, by a report engine, a unified view of the electronic content management system from the analytics cube, the unified view comprising a view on the event information from the electronic content management system that appears to be from a single data source.

16. The system as in claim 14, wherein the operations further comprise:

generating, by a report engine, a report based on results from querying of the integrated event information facilitated by the star schema.

17. The system as in claim 13, wherein the one or more attributes of the event information comprise one or more of an event activity, an event process, and an event task.

18. The system as in claim 13, wherein the event information comprises one or more of a time of the event and a user associated with the event.

* * * * *